United States Patent
Koshisaka

(10) Patent No.: US 11,367,168 B2
(45) Date of Patent: Jun. 21, 2022

(54) IMAGE PROCESSING APPARATUS AND METHOD

(71) Applicant: DENSO CORPORATION, Kariya (JP)

(72) Inventor: Yuzuru Koshisaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/083,654

(22) Filed: Oct. 29, 2020

(65) Prior Publication Data
US 2021/0133941 A1    May 6, 2021

(30) Foreign Application Priority Data
Oct. 31, 2019 (JP) .............................. JP2019-198665

(51) Int. Cl.
*G06T 5/40*    (2006.01)
*G06T 5/00*    (2006.01)
*G06V 10/56*   (2022.01)
*G06V 10/60*   (2022.01)

(52) U.S. Cl.
CPC ............... *G06T 5/40* (2013.01); *G06T 5/009* (2013.01); *G06V 10/56* (2022.01); *G06V 10/60* (2022.01); *G06T 2207/30252* (2013.01)

(58) Field of Classification Search
CPC . G06T 5/40; G06T 5/009; G06T 2207/30252; G06K 9/4652; G06K 9/4661; G06K 9/00791; G06K 9/03; G06K 9/4642
USPC ......................................................... 382/167
See application file for complete search history.

(56) References Cited

U.S. PATENT DOCUMENTS

| | | | |
|---|---|---|---|
| 2004/0234153 A1* | 11/2004 | Nakami | G06T 5/009 382/254 |
| 2011/0050934 A1* | 3/2011 | Mitsunaga | H04N 1/6005 348/222.1 |
| 2016/0110855 A1* | 4/2016 | Hirayama | G06T 5/40 382/168 |
| 2017/0039688 A1* | 2/2017 | Hirayama | G06T 5/40 |
| 2018/0035088 A1* | 2/2018 | Nose | H04N 5/23229 |
| 2018/0309940 A1 | 10/2018 | Okada et al. | |
| 2020/0100672 A1* | 4/2020 | Murase | A61B 3/12 |

FOREIGN PATENT DOCUMENTS

JP    2006-339994 A    12/2006

* cited by examiner

*Primary Examiner* — Ali Bayat
(74) *Attorney, Agent, or Firm* — Maschoff Brennan

(57) ABSTRACT

In an image processing apparatus, an image acquirer is configured to acquire a captured image from a camera mounted to a vehicle. A histogram generator is configured to generate a histogram representing a relationship between a luminance and a pixel count of the captured image. The pixel count is a number of pixels in the captured image. An image corrector is configured to generate a corrective tone-curve for correcting the relationship between the luminance and the pixel count of the captured image based on the histogram of the captured image, and correct the captured image using the corrective tone-curve to generate a corrected image. The corrective tone-curve is a tone-curve representing a relationship between input and output values of luminance.

8 Claims, 12 Drawing Sheets

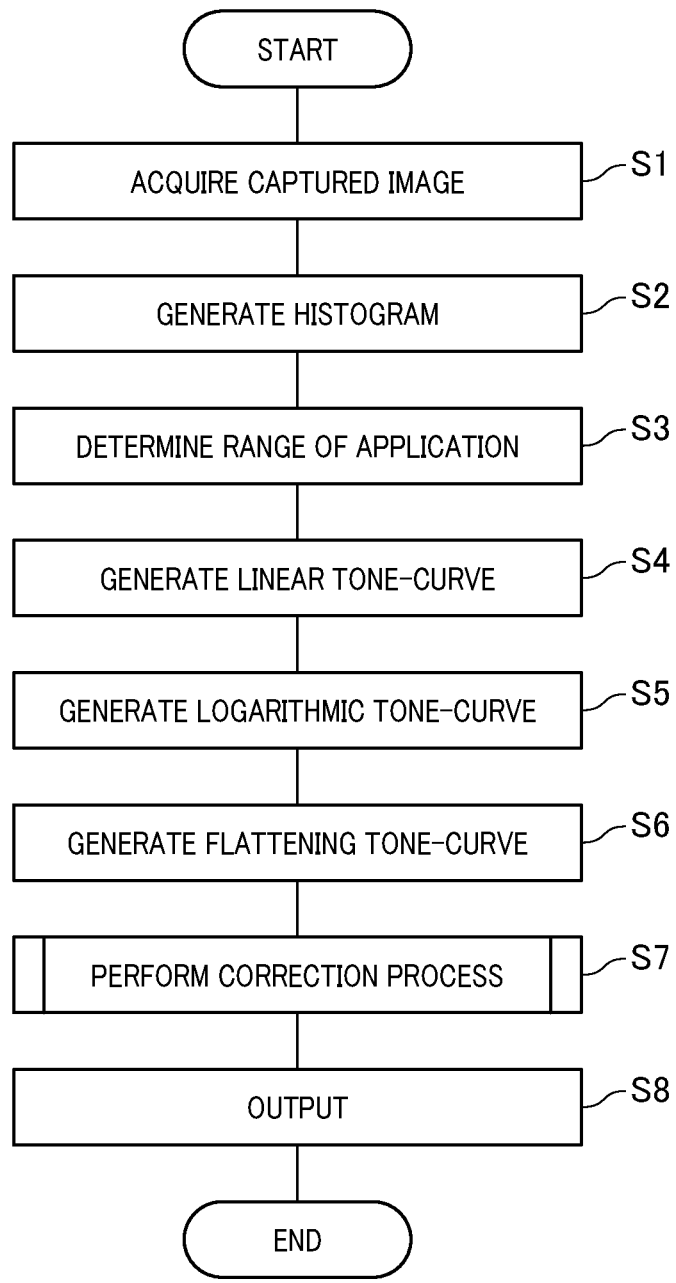

FIG.15
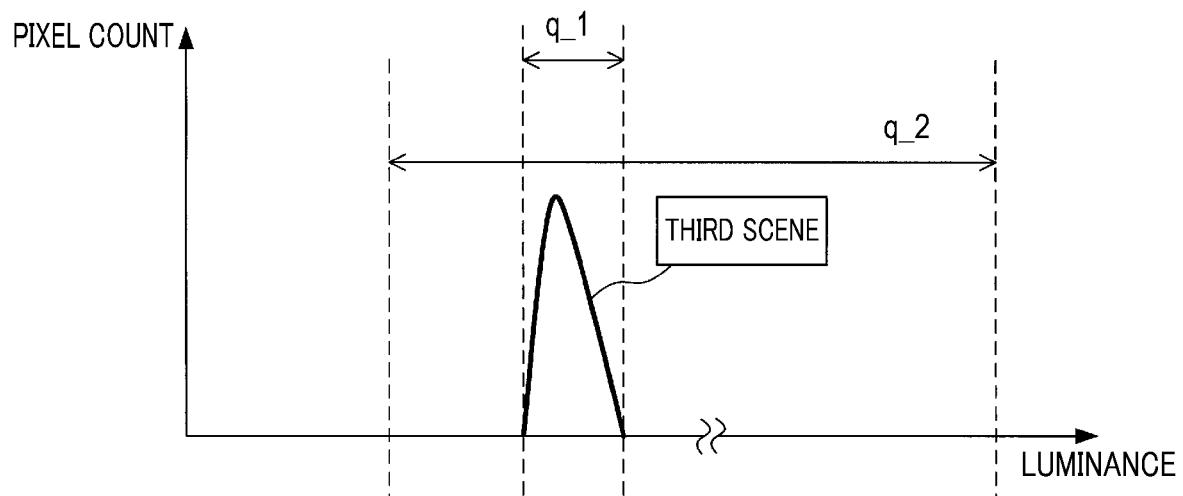
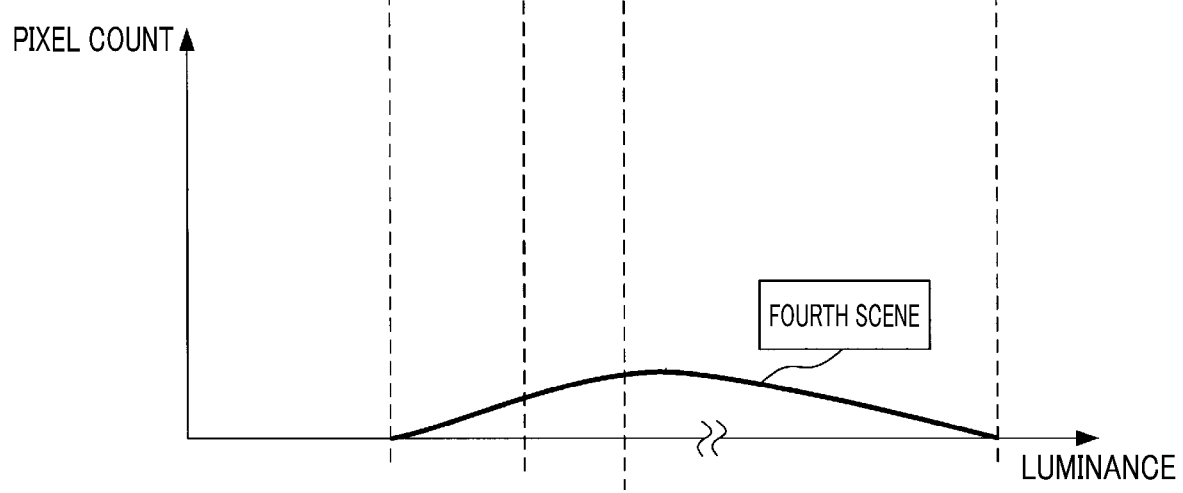

IMAGE PROCESSING APPARATUS AND METHOD

CROSS-REFERENCE TO RELATED APPLICATION

This application is based on and claims the benefit of priority from earlier Japanese Patent Application No. 2019-198665 filed Oct. 31, 2019, the description of which is incorporated herein by reference.

BACKGROUND

Technical Field

This disclosure relates to an image processing apparatus and method.

Related Art

Techniques are known for luminance correction of images captured by a camera.

In luminance correction, images are corrected in brightness, contrast and the like. The luminance correction includes using a tone-curve representing a relationship between input and output values of luminance.

BRIEF DESCRIPTION OF THE DRAWINGS

In the accompanying drawings:

FIG. 3 is a flowchart of an image generation process;

FIG. 15 is an example of distribution widths of histograms in third and fourth scenes.

DESCRIPTION OF SPECIFIC EMBODIMENTS

Figure 1:
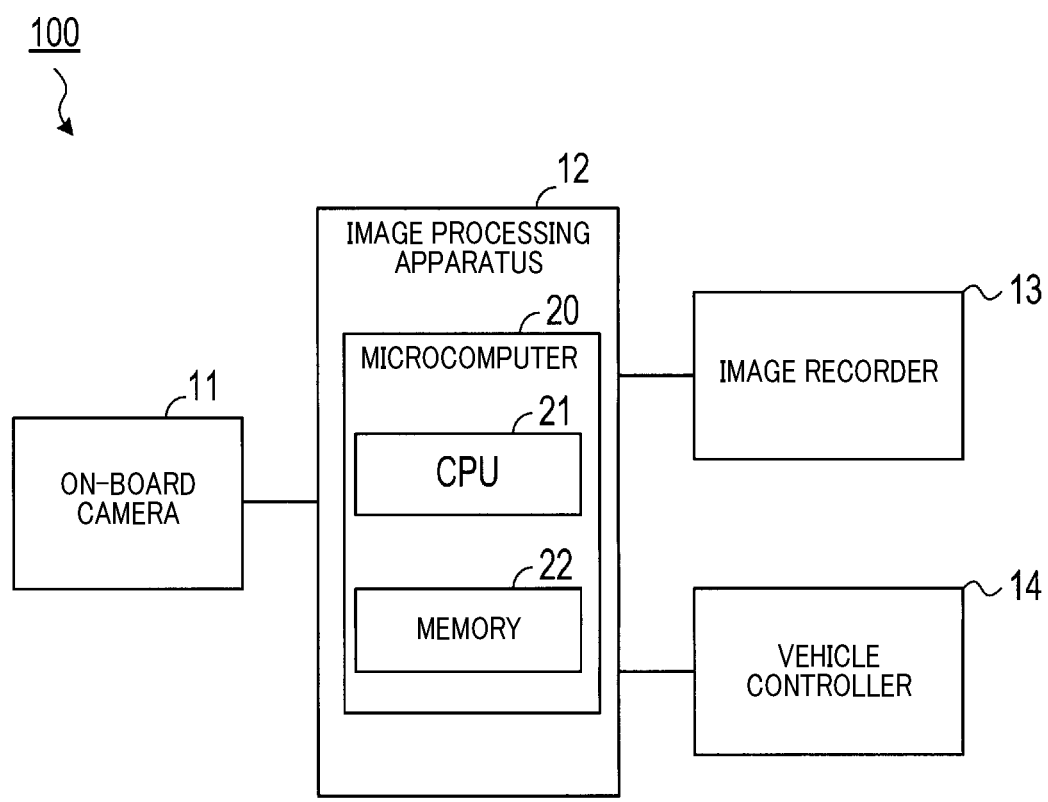
FIG. 1 is a block diagram of an image processing system.

In the above technique, as disclosed in JP-A-2016-111475, a tone-curve defining a relationship between input and output values of luminance is used in luminance correction.

However, as a result of detailed research performed by the present inventors, an issue has been found that, since the relationship between input and output values of luminance defined by the tone-curve is fixed in the above technique, it is impossible to acquire appropriate corrected images depending on imaging scenes.

In view of the foregoing, it is desired to have an image processing apparatus able to acquire appropriate corrected images depending on imaging scenes.

One aspect of the present disclosure provides an image processing apparatus including an image acquirer configured to acquire a captured image from a camera mounted to a vehicle. In the image processing apparatus, a histogram generator is configured to generate a histogram representing a relationship between a luminance and a pixel count of the captured image. The pixel count is a number of pixels in the captured image. An image corrector is configured to generate a corrective tone-curve for correcting the relationship between the luminance and the pixel count of the captured image based on the histogram of the captured image, and correct the captured image using the corrective tone-curve to generate a corrected image. The corrective tone-curve is a tone-curve representing a relationship between input and output values of luminance.

The distribution of the histogram of the captured image differs depending on the imaging scene. The image processing apparatus according to this aspect of the present disclosure generates the corrective tone-curve based on the histogram of the captured image, and using the corrective tone-curve, performs luminance correction of the captured image. This enables luminance correction using the corrective tone-curve depending on the imaging scene. That is, an appropriate corrected image can be acquired depending on the imaging scene.

Hereinafter, exemplary embodiments of the present disclosure will be described in detail with reference to the accompanying drawings, in which like reference numerals refer to like or similar elements regardless of reference numerals and duplicated description thereof will be omitted.

1. Overall Configuration

An image processing system 100, which may be mounted to a vehicle, will now be described with reference to FIG. 1. Hereinafter, the vehicle carrying the image processing system 100 will be referred to as an own vehicle. The image processing system 100 includes an on-board camera 11 and an image processing apparatus 12. The image processing system 100 may further include an image recorder 13 and a vehicle controller 14. The on-board camera 11, the image recorder 13, and the vehicle controller 14 are connected to the image processing apparatus 12 via signal lines.

The on-board camera 11 may be installed on a front windshield with a predetermined range of a road surface forward of the own vehicle being an imaging range of the on-board camera 11. The on-board camera 11 captures images every predetermined imaging period, for example, every 1/60 second. The on-board camera 11 converts captured images into digital signals and outputs them to the image processing apparatus 12. The installation position, the imaging range, and the imaging period of the on-board camera 11 may be set arbitrarily.

The image recorder 13 may be installed on the front windshield within a field of view of a driver of the own vehicle. The image recorder 13 records or displays corrected images output from the image processing apparatus 12.

The vehicle controller 14 is an electronic control unit (ECU) that includes a microcomputer formed of a central processing unit (CPU) and a semiconductor memory which is a set of a read-only memory (ROM), a random-access memory (RAM), a flash memory and the like. The vehicle controller 14 may be configured to estimate lane divider lines based on corrected images output from the image processing apparatus 12, and based on a result of estimation, perform driving assistance including alert output control and cruise control. In the alert output control, an alert is output when the own vehicle is about to deviate from a lane in which the own vehicle is traveling. In the cruise control, steering control and braking control are performed so as to cause the own vehicle to travel in a lane.

The image processing apparatus 12 is an electronic control unit (ECU) that includes a microcomputer 20 formed of a central processing unit (CPU) and a semiconductor memory (hereinafter, a memory) 22 which is a set of a read-only memory (ROM), a random-access memory (RAM), a flash memory and the like. The image processing apparatus 12 implements various functions as illustrated in FIG. 2A by the CPU 21 executing computer programs stored in the memory 22 corresponding to a non-transitory tangible storage medium.

Figure 2A:
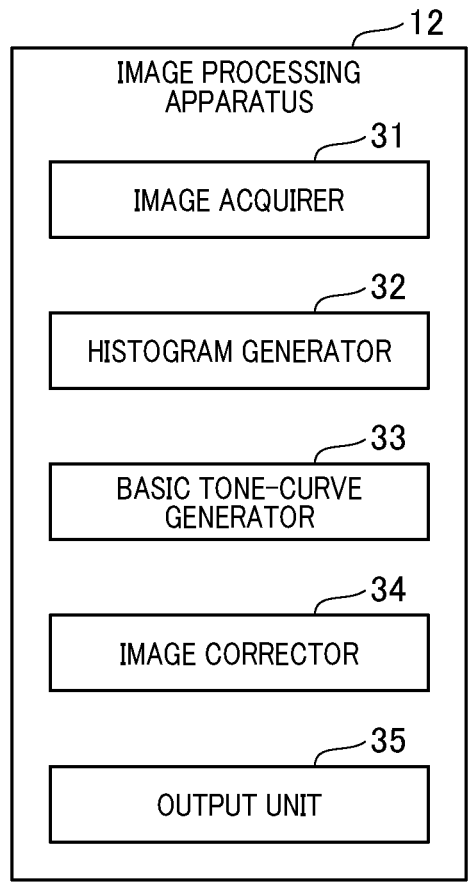
FIG. 2A is a functional block diagram of an image processing apparatus.

The image processing apparatus 12, as illustrated in FIG. 2A, includes an image acquirer 31, a histogram generator 32, a basic tone-curve generator 33, an image corrector 34, and an output unit 35.

The image acquirer 31 is configured to acquire images captured by the on-board camera 11. The captured images are color images having, for each pixel, a red component value, a green component value, and a blue component value. In one alternative embodiment, the captured images may be color images having any one of a red component value, a green component value, and a blue component value, or may be black-and-white images.

The histogram generator 32 is configured to generate, for each captured image, histograms of the captured image. Each histogram of the captured image represents the pixel count or the number of pixels (hereinafter also referred to as a frequency) at each luminance. The luminance is represented by a pixel value. For color images, a histogram is generated for each of the red, green, and blue components of each image.

The basic tone-curve generator 33 is configured to, for each histogram of each captured image, generate a plurality of basic tone-curves. The plurality of basic tone-curves are a plurality of tone-curves different in characteristic. In the present embodiment, three basic tone-curves, that is, a linear tone-curve, a logarithmic tone-curve, and a flattening tone-curve are generated as the plurality of tone-curves.

The image corrector 34 is configured to, based on a distribution of the histogram, generate a corrective tone-curve, and based on the corrective tone-curve, perform luminance correction of the captured image. The corrective tone-curve is a tone-curve used to perform luminance correction of the captured image. The corrective tone-curve is generated by combining the plurality of basic tone-curves in combination ratios determined for the respective basic tone-curves.

The output unit 35 is configured to output corrected images. The corrected images are captured images corrected based on the corrective tone-curve.

In an image generation process described later, the image acquirer 31 is responsible for executing step S1. The histogram generator 32 is responsible for executing step S2. The basic tone-curve generator 33 is responsible for executing steps S3-S6. The image corrector 34 is responsible for executing step S7. The output unit 35 is responsible for executing step S8.

Various Processes 2-1. Image Generation Process

An image generation process to be performed by the image processing apparatus 12 will now be described with reference to the flowchart of FIG. 3. In the present embodiment, the image generation process is initiated each time the on-board camera 11 captures an image.

At step S1, the image processing apparatus 12 acquires a captured image from the on-board camera 11. The captured image will hereinafter be referred to as an acquired image.

At step S2, the image processing apparatus 12 generates a histogram of the acquired image. To be precise, as mentioned above, if the acquired image is a color image, the image processing apparatus 12 generates a histogram for each RGB color component of the acquired image. It should be noted that the method described later of the present disclosure is applicable to any one of the histograms for the RGB color components of each acquired image.

At step S3, the image processing apparatus 12 determines a range of application. The range of application is a range of luminance within which the luminance correction is performed on the acquired image. Determining the range of application means determining a minimum brightness corresponding to a minimum luminance and a maximum brightness corresponding to a maximum luminance. A range of luminance from the minimum brightness to the maximum brightness is determined as the range of application within which the basic tone-curves are applied.

For example, the image processing apparatus 12 may determine, in the the histogram of the acquired image, the upper limit of luminance minus a predetermined percentage as the maximum brightness. The image processing apparatus 12 may smooth changes in the upper limit of luminance over time using a filter such as a median filter or the like. The image processing apparatus 12 may predetermine the upper limit of luminance for each target that may be included in the acquired image. The image processing apparatus 12 may use, for the target, the upper limit of luminance as the maximum brightness even if the histogram extends above the upper limit of luminance predetermined for the target.

For example, the image processing apparatus 12 may determine, in the histogram of the acquired image, the lower limit of luminance plus a predetermined percentage as the minimum brightness. The image processing apparatus 12 may smooth changes in the lower limit of luminance over time using a filter such as a median filter or the like. The image processing apparatus 12 may predetermine the lower limit of luminance for each target that may be included in the acquired image. The image processing apparatus 12 may use, for the target, the lower limit of luminance as the minimum brightness even if the histogram extends below the lower limit of luminance predetermined for the target.

At steps S4-S6, the image processing apparatus 12 generates a plurality of different basic tone-curves based on the histogram of the acquired image. Each tone-curve defines a relationship between input and output values. The basic tone-curves include a linear tone-curve, a logarithmic tone-curve, and a flattening tone-curve.

Figure 4:
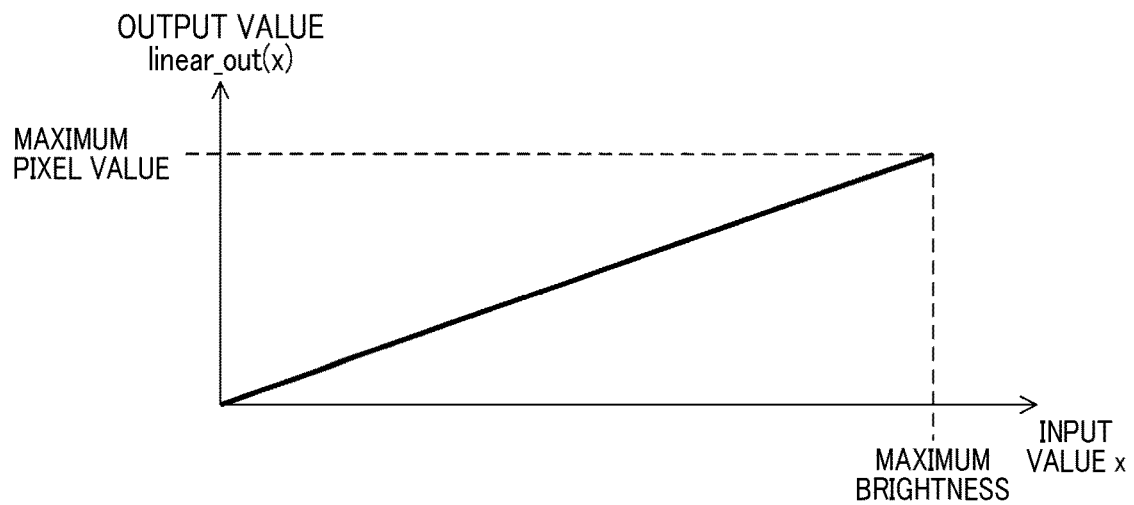
FIG. 4 is an example of a linear tone-curve.

At step S4, the image processing apparatus 12 generates the linear tone-curve. The linear tone-curve is a tone-curve that defines a linear relationship between input and output values of luminance. FIG. 4 shows an example of the linear tone-curve. The linear tone-curve is expressed by the equation (1) such that the maximum brightness corresponds to a maximum of pixel value (hereinafter referred to as a maximum pixel value). The pixel value is represented by n bits and converted to an integer in the range of 0 to $2n-1$. $2n-1$ corresponds to the maximum pixel value. N is an integer equal to or greater than one. For example, in the present embodiment, the pixel values may be represented by 16 bits.

$$\text{linear\_out}(x) = \frac{\text{out\_max}}{\text{hist\_max}} x \quad (1)$$

Here, x represents an input value of luminance, linear_out(x) represents an output value of luminance, hist_max represents a maximum brightness, and out_max represents a maximum pixel value. This linear tone-curve shows that linear_out(x) reaches the maximum pixel value when x=hist_max.

The image processing apparatus 12 stores the equation (1) in the memory 22. More specifically, the image processing apparatus 12 stores parameters (i.e., hist_max and out_max) describing the equation (1) in the memory 22.

Figure 5:
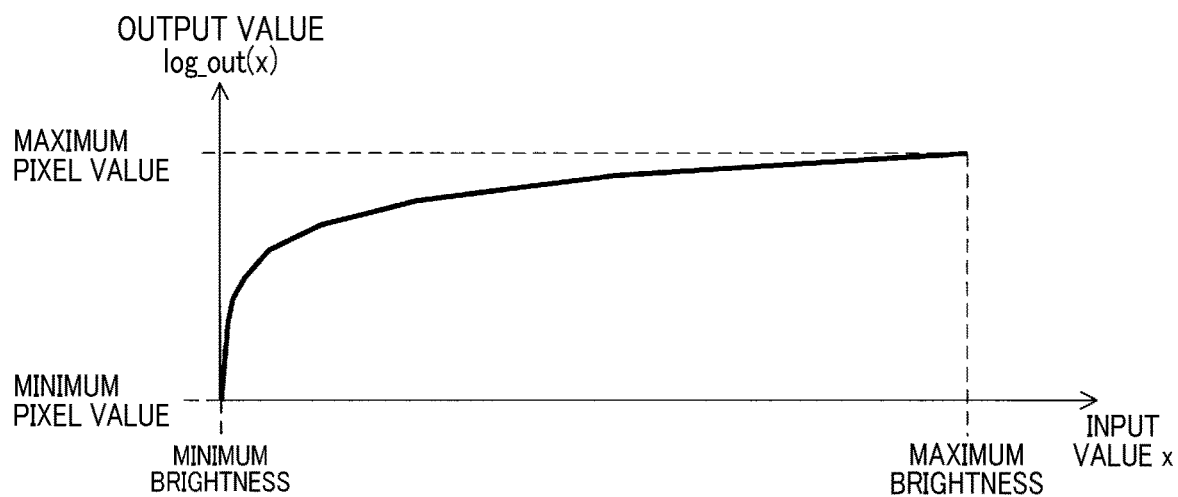
FIG. 5 is an example of a logarithmic tone-curve.

At step S5, the image processing apparatus 12 generates the logarithmic tone-curve. The logarithmic tone-curve is a tone-curve that defines a logarithmic relationship between input and output values of luminance. FIG. 5 shows an example of the logarithmic tone-curve. The logarithmic tone-curve is expressed by the equations (2)-(4) such that the maximum brightness corresponds to a maximum of pixel value and the minimum brightness corresponds to a minimum of pixel value (hereinafter referred to as a minimum pixel value).

$$\begin{aligned} \log\_\text{out}(x) = 0 & \quad (x = 0) \\ \log\_\text{out}(x) = a\log(x) + b & \quad (x > 0) \end{aligned} \quad (2)$$

where $$a = \frac{\text{out\_max}}{\log\left[\frac{\text{hist\_min}}{\text{hist\_max}}\right]} \quad (3)$$

$$b = a\log(\text{hist\_min}) \quad (4)$$

Here, x represents an input value of luminance, log_out(x) represents an output value of luminance, hist_max represents a maximum brightness, hist_min represents a minimum brightness, and out_max represents a maximum pixel value. This linear tone-curve shows that linear_out(x) reaches the maximum pixel value when x=hist_max. In the equation (2), a is expressed by the equation (3), and b is expressed by the equation (4). The image processing apparatus 12 stores the equations (2)-(4) in the memory 22. More specifically, the image processing apparatus 12 stores parameters (i.e., hist_max, hist_min, and out_max) describing the equations (2)-(4) in the memory 22.

Figure 6:
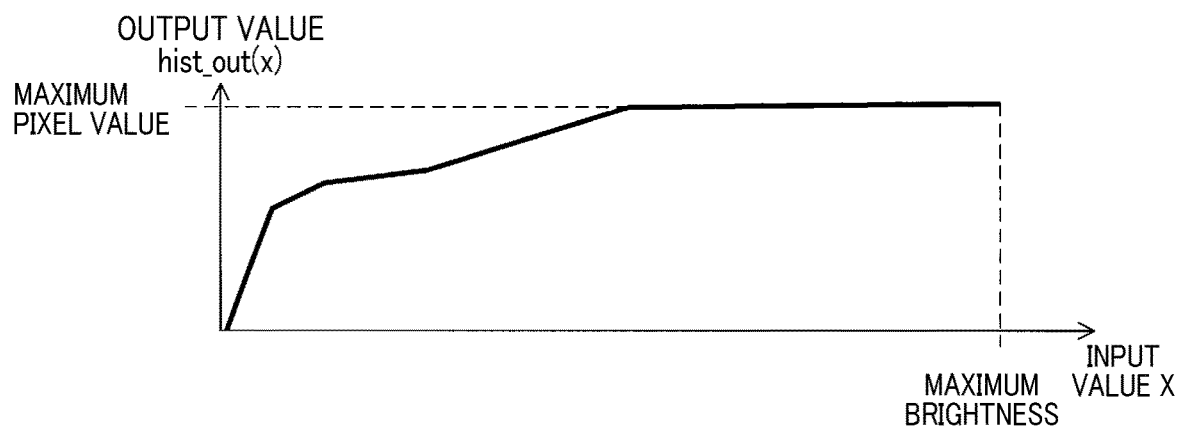
FIG. 6 is an example of a flattening tone-curve.

At step S6, the image processing apparatus 12 generates the flattening tone-curve. The flattening tone-curve is a tone-curve that defines a relationship between input and output values of luminance such that frequencies (i.e., pixel counts) of the histogram are flattened. FIG. 6 shows an example of the flattening tone-curve. The flattening tone-curve is expressed by the equations (5), (6).

$$\text{hist\_out}(x) = -\frac{\text{out\_max}}{\text{hist\_total}} \sum_{i=0}^{y} \text{bin}(i) \quad (5)$$

where $$y = H\log(x) \quad (6)$$

Here, H is a preset constant representing the bin resolution of the histogram of the acquired image and is pre-stored in the memory 22, out_max represents a maximum pixel value, Hist_total represents the total pixel count (i.e., the total number of pixels), and bin(i) represents represents a frequency of each bin of the histogram. The total pixel count is a sum of the pixel counts of the acquired image.

The image processing apparatus 12 stores the equations (5) and (6) in the memory 22. More specifically, the image processing apparatus 12 stores parameters (i.e., H, out_max, hist_total) describing the equations (5) and (6) in the memory 22.

At step S7, the image processing apparatus 12 performs a luminance correction process. In the luminance correction process, the image processing apparatus 12 generates a corrective tone-curve based on the histogram of the acquired image, and using the corrective tone-curve, correct a relationship between the luminance and the pixel count in the acquired image, thereby generating a corrected image. The luminance correction process will be described later.

At step S8, the image processing apparatus 12 outputs the corrected image to the image recorder 13 and the vehicle controller 14. Thereafter, the image generation process ends.

2-2. Luminance Correction Process

Figure 7:
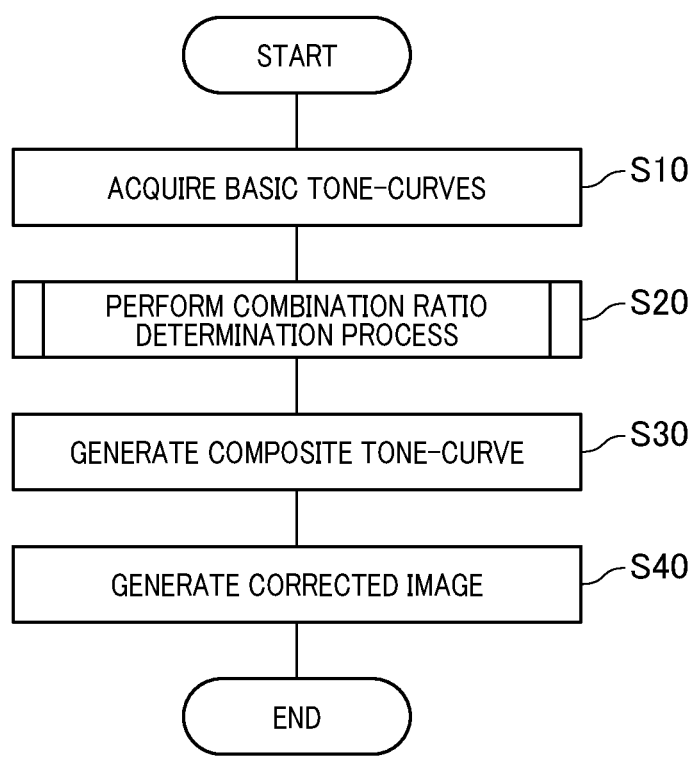
FIG. 7 is a flowchart of a luminance correction process.

The luminance correction process to be performed by the image processing apparatus 12 at step S7 in the image generation process will now be described with reference to a flowchart of FIG. 7.

At step S10, the image processing apparatus 12 acquires the plurality of basic tone-curves: the linear tone-curve, the logarithmic tone-curve, and the flattening tone-curve.

At step S20, the image processing apparatus 12 performs a combination ratio determination process. In the combination ratio determination process, the image processing apparatus 12 determines combination ratios of respective ones of the plurality of basic tone-curves based on the histogram of the acquired image. The combination ratios are used to generate a composite tone-curve, that is, a corrective tone-curve, by combining the plurality of basic tone-curves. The corrective tone-curve is a sum of the plurality of basic tone-curves multiplied by the respective combination ratios.

A sum of the combination ratios of the respective basic tone-curves is one. That is, a sum of the combination ratio of the linear tone-curve (hereinafter referred to as A-value), the combination ratio of the logarithmic tone-curve (hereinafter referred to as B-value), and the combination ratio of the flattening tone-curve (hereinafter referred to as C-value) is one. The combination ratio process will be described later.

At step S30, as expressed by the equation (7), the image processing apparatus 12 generates a composite tone-curve by combining the plurality of basic tone-curves in the combination ratios determined at step S20.

$$C\_\text{out}(x) = A \times \text{linear\_out}(x) + B \times \text{log\_out}(x) + C \times \text{hist\_out}(x) \quad (7)$$

Figure 13:
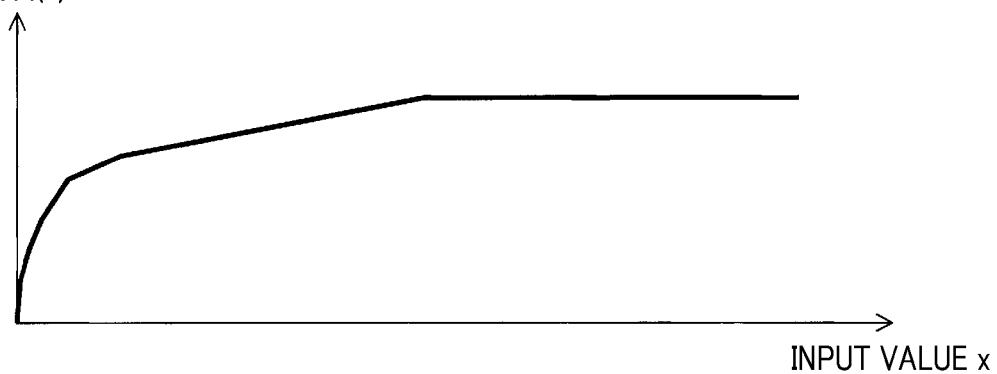
FIG. 13 is an example of a corrective (i.e., composite) tone-curve.

Here, x represents an input value of luminance, and C_out(x) represents an output value of luminance based on the composite tone-curve. FIG. 13 shows an example composite tone-curve that will be described later.

At step S40, using the composite tone-curve as the corrective tone-curve, the image processing apparatus 12 corrects a relationship between the luminance and the pixel count in the acquired image to generate a corrected image. The corrected image is an image having a relationship between the luminance and the pixel count in the acquired image corrected using the composite tone-curve. Thereafter, the luminance correction process ends.

2-3. Combination Ratio Determination Process

Figure 8:
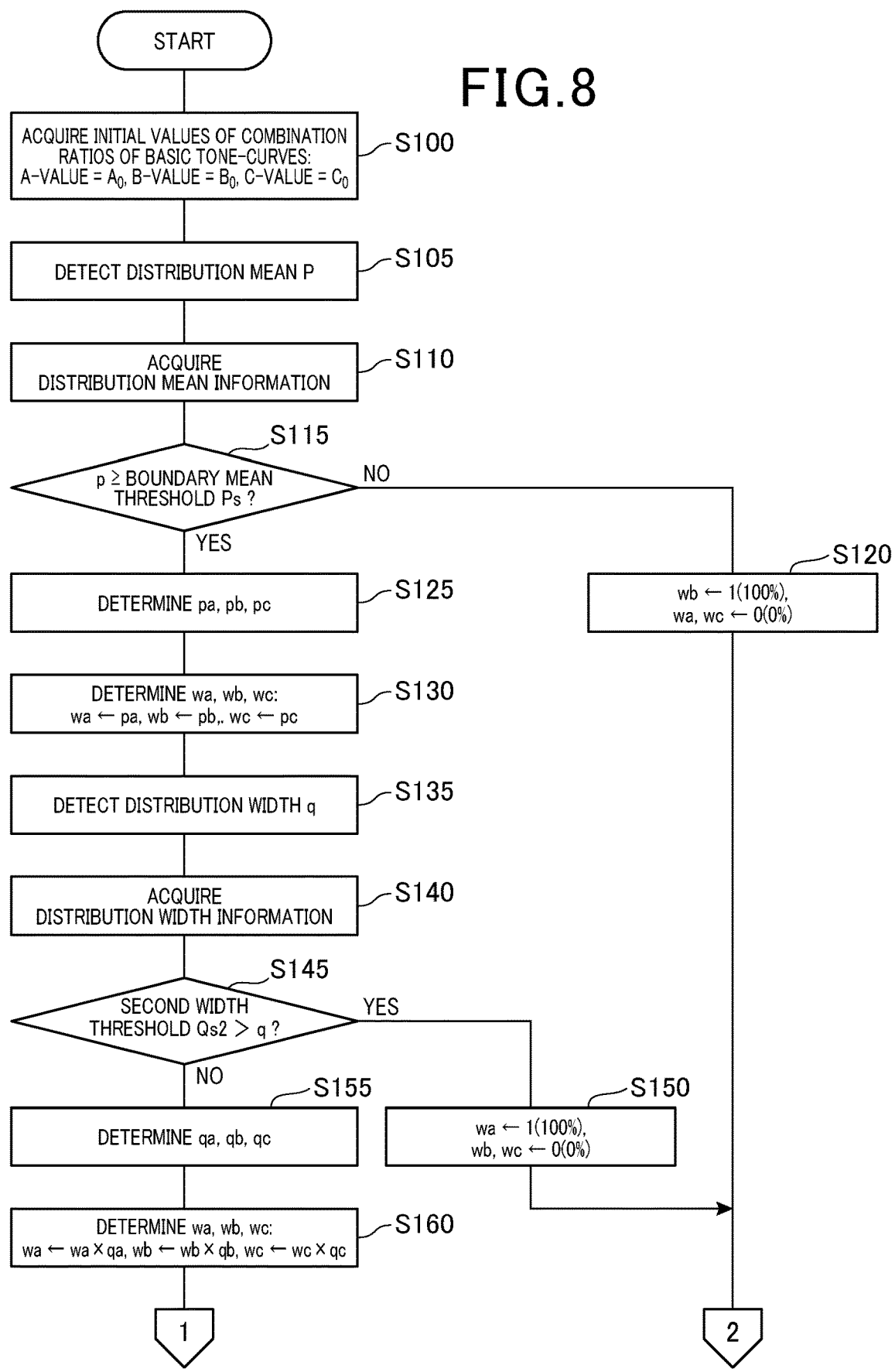
FIGS. 8 and 9 are two parts of a single flowchart of a combination ratio determination process.
Figure 9:
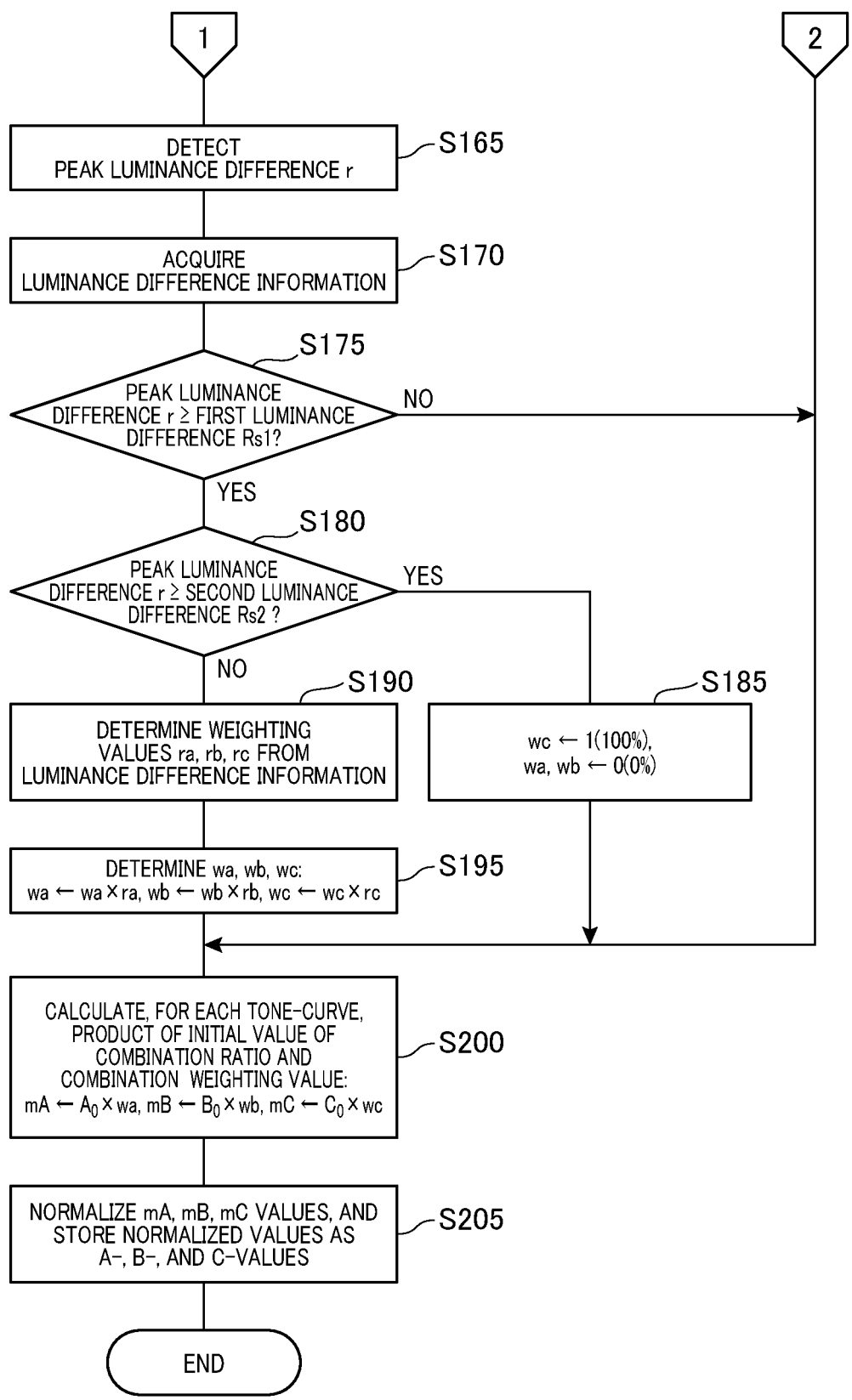

The combination ratio determination process at step S20 of the luminance correction process to be performed by the image processing apparatus 12 will now be described with reference to flowcharts of FIGS. 8 and 9. In the combination ratio determination process, the image processing apparatus 12 detects a distribution mean p of the histogram, a distribution width q of the histogram, and the presence of a plurality of separate peak luminances in the histogram, and based on a result of detection, determines a combination ratio of each of the plurality of basic tone-curves.

The distribution mean p of the histogram of the acquired image is a sum of a product of the luminance and the the pixel count of each bin in the histogram, divided by the total pixel count (that is the total number of pixels). The distribution width q is a luminance width of the histogram of the acquired image, that is, a difference in luminance between the maximum brightness and the minimum brightness.

The presence of a plurality of separate peak luminances means that a peak luminance difference r is equal to or greater than a predetermined value (that is Rs1 described later). The peak luminance difference r is a difference between a low peak luminance and a high peak luminance. The low peak luminance is a minimum of luminance at which the frequency transitions from increasing to decreasing when following changes in frequency of the histogram from a lowest bin. The high peak luminance is a maximum of luminance at which the frequency transitions from increasing to decreasing while following changes in frequency of the histogram from a highest bin.

At step S100, the image processing apparatus 12 acquires an initial value of combination ratio of each of the linear tone-curve, the logarithmic tone-curve, and the flattening tone-curve. The initial values are pre-stored in the memory 22. For example, the initial value of combination ratio of the linear tone-curve (referred to as an A-value) is A0, the initial value of combination ratio of the logarithmic tone-curve (referred to as a B-value) is B0, and the initial value of combination ratio of the flattening tone-curve (referred to as a C-value) is C0. For example, each of A0, B0, and C0 may be ⅓.

At step S105, the image processing apparatus 12 calculates a distribution mean p based on the histogram of the acquired image.

At step S110, the image processing apparatus 12 acquires distribution mean information. The distribution mean information may be information associating a weighting value for each basic tone-curve with the distribution mean p. The weighting value for each basic tone-curve is a numerical value equal to or less than 1, which represents the degree to which the basic tone-curve contributes to the composite tone-curve to be generated. A larger numerical value means a higher degree to which the basic tone-curve contributes to the composite tone-curve. The distribution mean information may be represented in a table format. The distribution mean information is pre-stored in the memory 22. In the present embodiment, the weighting values are determined for each result of detection as to the presence or absence of a plurality of separate peak luminances.

Figure 10:
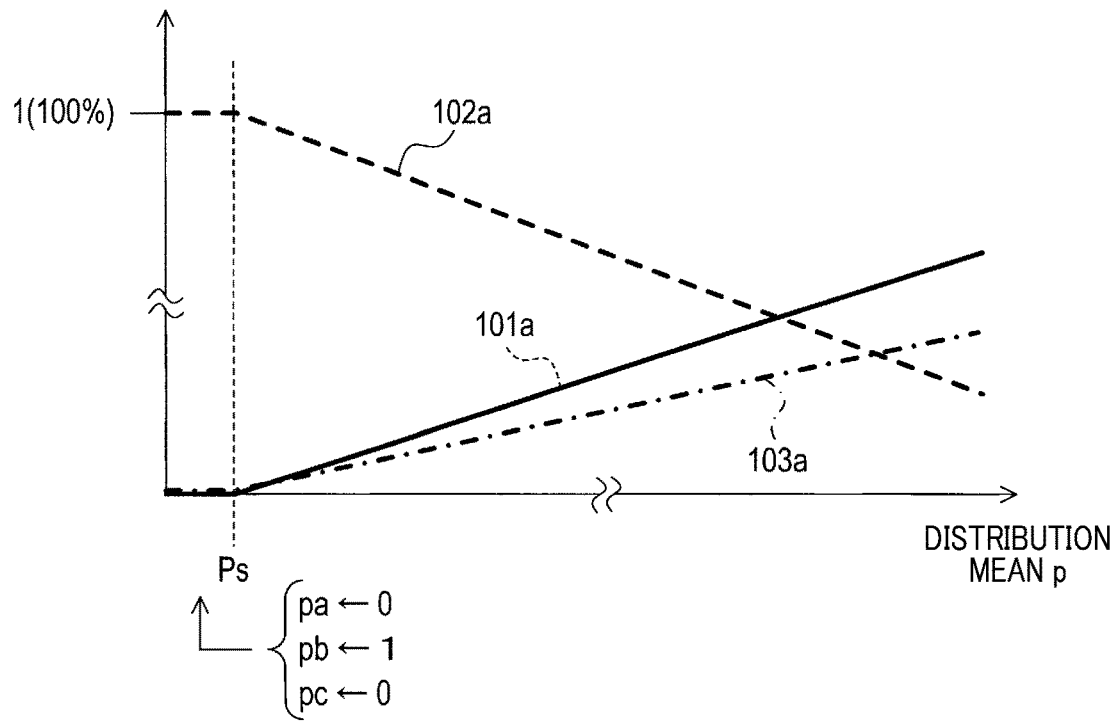
FIG. 10 is an illustration of an example of distribution mean information.

FIG. 10 illustrates an example of distribution mean information according to the present embodiment. In FIG. 10, the weighting value for the linear tone-curve indicated by the solid line 101a is referred to as a pa-value, the weighting value for the logarithmic tone-curve indicated by the dotted line 102a is referred to as a pb-value, and the weighting value for the flattening tone-curve indicated by the dashed-dotted line 103a is referred to as a pc-value. That is, the distribution mean information is information associating each of the weighting values pa, pb, and pc with the distribution mean p such that the pb-value is increased and the pa- and pc-values are decreased as the distribution mean p decreases.

In the present embodiment, the distribution mean information indicates that, if the distribution mean p is less than a predetermined boundary mean threshold Ps, then the pb-value is set to 1 and the pa- and pc-values are set to 0, and if the distribution mean p is equal to or greater than the predetermined boundary mean threshold Ps (i.e. if the distribution mean p≥Ps), then the weighting values are set such that pb>pa>pc at the same mean p.

At step S115, the image processing apparatus 12 determines whether the distribution mean p is equal to or greater than the boundary mean threshold Ps. The boundary mean threshold Ps may be a distribution mean of an image captured in a very dark imaging scene during the night with no lighting. The boundary mean threshold Ps is preset by experiment, learning or the like, and is stored in the memory 22. If the distribution mean p is less than the boundary mean threshold Ps, the process flow proceeds to step S120. If the distribution mean p is equal to or greater than the boundary mean threshold Ps, the process flow proceeds to step S125. The distribution mean p less than the boundary means threshold Ps means that the acquired image was captured in a relatively very dark imaging scene as described above.

At step S120, the image processing apparatus 12 calculates combination weighting values. The combination weighting values are weighting values for the respective tone-curves determined based on at least one of the distribution mean, the distribution width, and a result of detection as to the presence or absence of a plurality of separate peak luminances in the histogram. The combination weighting value for the linear tone-curve is referred to as a wa-value, the combination weighting value for the logarithmic tone-curve is referred to as a wb-value, and the combination weighting value for the flattening tone-curve is referred to as a wc-value.

At step S120, the image processing apparatus 12 sets the wb-value to 1 (i.e., 100%), the wa-value and wc-value to 0 (i.e., 0%). Thereafter, the process flow proceeds to step S200.

At step S125, the image processing apparatus 12 determines a pa-value, a pb-value, and a pc-value corresponding to the distribution mean from the distribution mean information.

At step S130, the image processing apparatus 12 determines the combination weighting values for the respective tone-curves. At step S130, the image processing apparatus 12 determines the pa-value as the wa-value, the pb-value as the wb-value, and the pc-value as the wc-value. The image processing apparatus 12 stores the wa-value, the wb-value, the wc-value in the memory 22.

At step S135, the image processing apparatus 12 detects a distribution width q based on the histogram of the acquired image.

At step S140, the image processing apparatus 12 acquires distribution width information. The distribution width information is information associating the weighting value for each basic tone-curve with the distribution width q. The distribution width information may be represented in a table format. The distribution width information is pre-stored in the memory 22.

Figure 11:
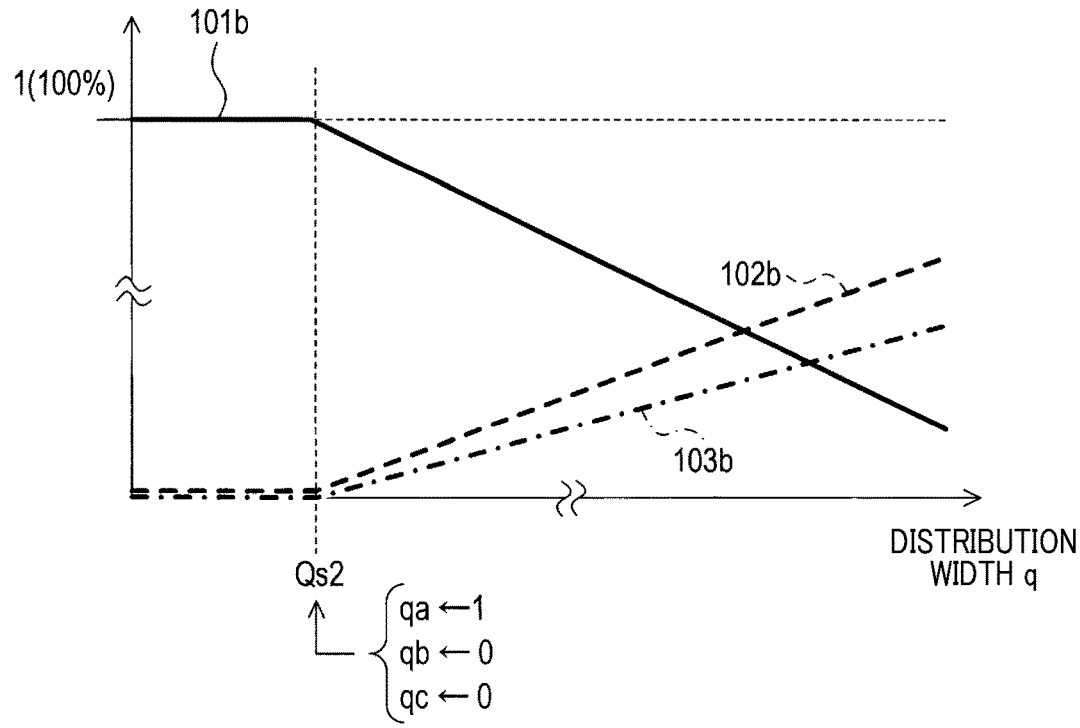
FIG. 11 is an illustration of an example of distribution width information.

FIG. 11 illustrates an example of distribution width information according to the present embodiment. In FIG. 11, the weighting value for the linear tone-curve indicated by the solid line 101b is referred to as a qa-value, the weighting value for the logarithmic tone-curve indicated by the dotted line 102b is referred to as a qb-value, and the weighting value for the flattening tone-curve indicated by the dashed-dotted line 103b is referred to as a qc-value. That is, the distribution width information is information associating each of the weighting values qa, qb, and qc with the distribution width q such that the qa-value is decreased and the qb- and qc-values are increased as the distribution width q increases.

In the present embodiment, the distribution width information indicates that, if the distribution width q is less than a predetermined second width threshold Qs2, then the qa-value is set to 1 and the qb- and qc-values are set to 0. If the distribution width q is equal to or greater than the predetermined second width threshold Qs2, then the qb and qc-values are decreased and the qa-value is increased as the distribution width q decreases.

At step S145, the image processing apparatus 12 determines whether the distribution width q is less than the second width threshold Qs2. If the distribution width q is less than the second width threshold Qs2, then the process flow proceeds to step S150. If the distribution width q is equal to or greater than the second width threshold Qs2, then the process flow proceeds to step S155. The distribution width q less than the second width threshold Qs2 means that the distribution width q is relatively very narrow.

At step S150, the image processing apparatus 12 determines the combination weighting values. At step S150, the image processing apparatus 12 sets the wa-value to 1, the wb- and wc-values to 0. Thereafter, the process flow proceeds to step S200.

At step S155, the image processing apparatus 12 determines from the distribution width information the qa-value, the qb-value, and the qc-value corresponding to the distribution width q.

At step S160, the image processing apparatus 12 determines the combination weighting values. At step S160, the image processing apparatus 12 determines a product of the wa-value and the qa-value as a new wa-value, a product of the wb-value and the qb-value as a new wb-value, and a product of the wc-value and the qc-value as a new wc-value. The image processing apparatus 12 stores the new wa-value, the new wb-value, and the new wc-value in the memory 22.

At step S165, the image processing apparatus 12 detects a peak luminance difference r. More specifically, the image processing apparatus 12 detects a low peak luminance and a high peak luminance in the histogram of the acquired image, and detects a difference between the low peak luminance and the high peak luminance as the peak luminance difference r, and stores it in the memory 22.

At step S170, the image processing apparatus 12 acquires luminance difference information. The luminance difference information is information associating the weighting value for each basic tone-curve with the peak luminance difference r. The luminance difference information may be represented in a table format. The luminance difference information is pre-stored in the memory 22.

Figure 12:
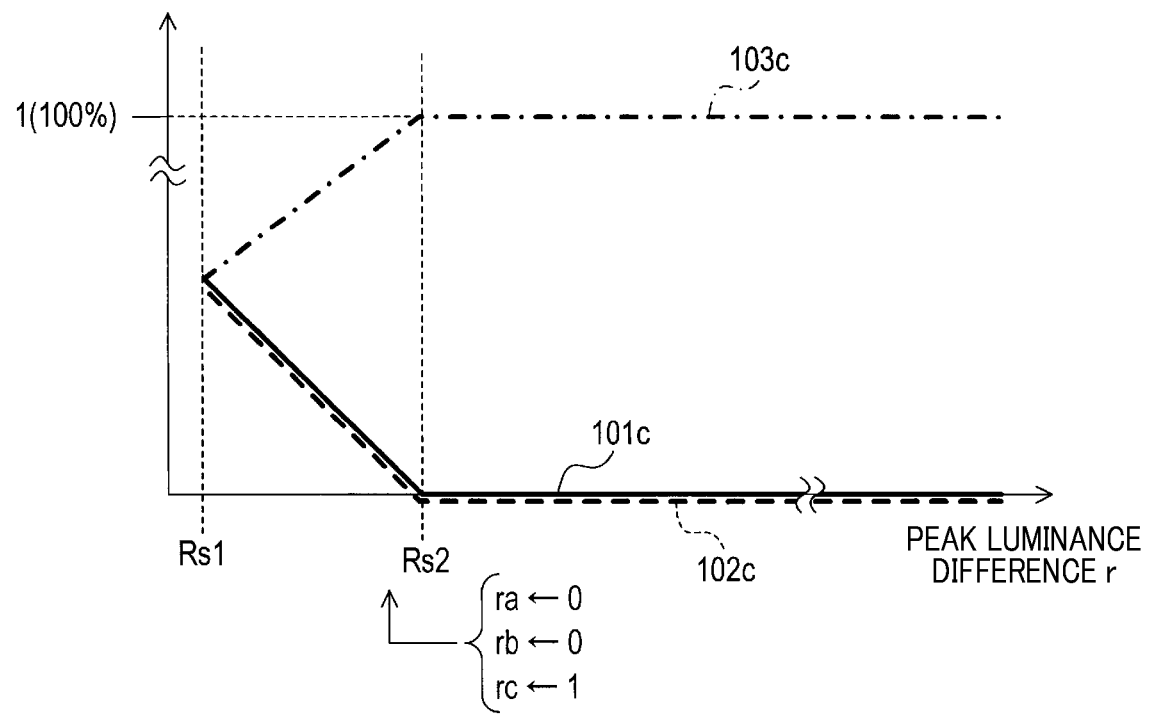
FIG. 12 is an illustration of an example of luminance difference information.

FIG. 12 illustrates an example of luminance difference information according to the present embodiment. In FIG. 12, the weighting value for the linear tone-curve indicated by the solid line 101c is referred to as a ra-value, the weighting value for the logarithmic tone-curve indicated by the dotted line 102c is referred to as a rb-value, and the weighting value for the flattening tone-curve indicated by the dashed-dotted line 103c is referred to as a rc-value. That is, the luminance difference information is information associating each of the weighting values ra, rb, and rc with the peak luminance difference r such that the rc-value is increased and the ra- and rb-values are decreased as the peak luminance difference r increases.

In the present embodiment, the luminance difference information indicates that, if the peak luminance difference r is equal to or greater than a predetermined second luminance difference threshold Rs2, then the rc-value is set to 1 and the ra and rb-values are set to 0.

At step S175, the image processing apparatus 12 determines the presence or absence of a plurality of separate peak luminances in the histogram of the acquired image. More specifically, the image processing apparatus 12 determines that there are a plurality of separate peak luminances in the histogram of the acquired image if the peak luminance difference r is equal to or greater than a predetermined first luminance difference Rs1.

If the image processing apparatus 12 determines the presence of a plurality of separate peak luminances in the histogram of the acquired image, the process flow proceeds to step S180. If the image processing apparatus 12 determines that there are not a plurality of separate peak luminances in the histogram of the acquired image, the process flow proceeds to step S200. The presence of a plurality of separate peak luminances in the histogram of the acquired image means that there are relatively bright areas and relatively dark areas in the acquired image, which means a skewed distribution of luminance.

At step S180, the image processing apparatus 12 determines whether the peak luminance difference r is equal to or greater than a predetermined second luminance difference threshold Rs2. If the image processing apparatus 12 determines that the peak luminance difference r is equal to or greater than the predetermined second luminance difference threshold Rs2, the process flow proceeds to step S185. If the image processing apparatus 12 determines that the peak luminance difference r is less than the predetermined second luminance difference threshold Rs2, the process flow proceeds to step S190. The peak luminance difference r equal to or greater than the predetermined second luminance difference threshold Rs2 means that the acquired image has a relatively more skewed distribution of luminance.

At step S185, the image processing apparatus 12 determines the combination weighting values. At step S185, the image processing apparatus 12 sets the wc-value to 1, the wa and wb-values to 0. Thereafter, the process flow proceeds to step S200.

At step S190, the image processing apparatus 12 determines from the luminance difference information a ra-value, a rb-value, and a rc-value corresponding to the peak luminance difference r.

At step S195, the image processing apparatus 12 determines the combination weighting values. At step S195, the image processing apparatus 12 determines a product of the wa-value and the ra-value as a new wa-value, a product of the wb-value and the rb-value as a new wb-value, and a product of the wc-value and the rc-value as a new wc-value.

The image processing apparatus 12 stores the new wa-value, the new wb-value, and the new we-value in the memory 22.

At step S200, the image processing apparatus 12 calculates, for each of the tone-curves, a product of the initial value of combination ratio and the combination weighting value. The product of the initial value of combination ratio and the combination weighting value for the linear tone-curve is referred to as a mA-value. The product of the initial value of combination ratio and the combination weighting value for the logarithmic tone-curve is referred to as a mB-value. The product of the initial value of combination ratio and the combination weighting value for the flattening tone-curve is referred to as a mC-value. The image processing apparatus 12 stores the mA-, mB-, and mC-values in the memory 22.

At step S205, the image processing apparatus 12 normalizes the mA-, mB-, and mC-values. In normalization of the mA-, mB-, and mC-values, the mA-, mB-, and mC-values are recalculated such that the total sum of the mA-, mB-, and mC-values becomes 1 with a fixed ratio of mA:mB:mC. The image processing apparatus 12 stores in the memory 22 the normalized mA-, mB-, and mC-values as the A-, B-, and C-values of combination ratios. Thereafter, the combination ratio determination process ends. Finally, based on the equation (7) using the resultant A-, B-, and C-values, the composite tone-curve as illustrated in FIG. 13 will be acquired as a corrective tone-curve.

3. Operations

Operations of the image processing apparatus 12 that corrects the acquired image using the corrective tone-curve generated as above will now be described.

3-1. Characteristics of Basic Tone-Curves

Characteristics of the respective basic tone-curves will now be described.

In cases where the width of the histogram of the captured image (i.e., the distribution width q) is relatively small or narrow, use of the linear tone-curve leads to changes in output pixel value proportional to changes in input pixel value, which allows for proper representation of contrast in the corrected image. In addition, a ratio of RGB pixel values is maintained in cases where the distribution width q is relatively small, which can provide proper representation of colors in the corrected image. However, in cases where the distribution width q is relatively large or wide, clipped whites and crushed shadows may occur in bright areas and dark areas, respectively, in the the corrected image.

Use of the logarithmic tone-curve can provide an expanded dynamic range in areas of the captured image where the luminance is low (i.e., dark areas) and in areas of the captured image where the luminance is high (i.e., bright areas). Therefore, the corrected image properly reflects the luminance ratio while the contrast is suppressed. However, a ratio of RGB pixel values may change in cases where the distribution width q is relatively large, which may fail to provide proper representation of colors in the corrected image.

Use of the flattening tone-curve expands an interval where the distribution of the histogram concentrates, which can provide higher contrast in the corrected image.

3-2. Effects of Image Processing Based on Distribution Mean p

Figure 14:
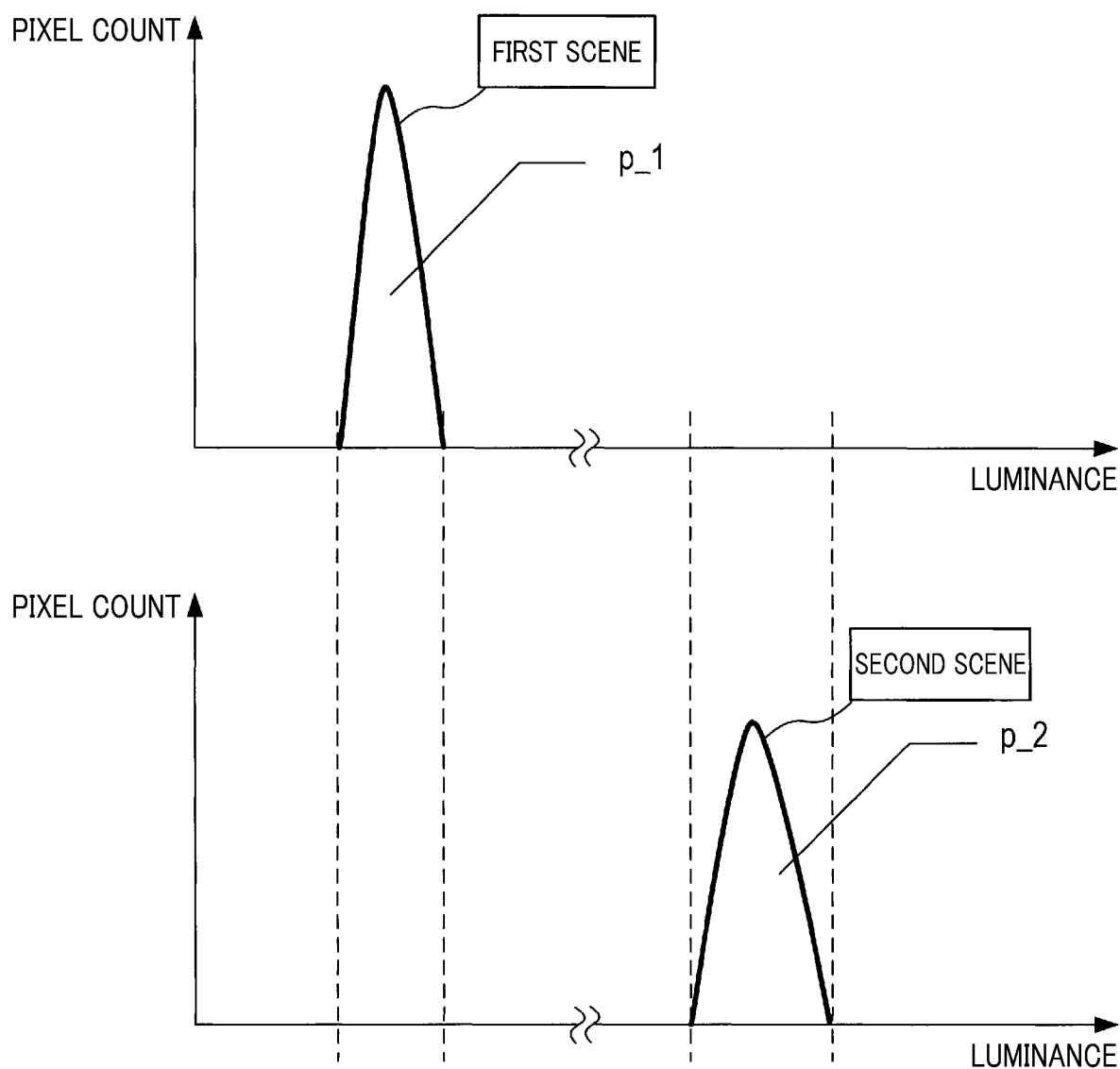
FIG. 14 is an example of distribution means of histograms in first and second scenes.

As illustrated in FIG. 14, the distribution mean p of the captured image in a dark imaging scene (a first scene), denoted by p_1, is less than the distribution mean p of the captured image in a bright imaging scene (a second scene), denoted by p_2. For example, the distribution mean p during the night is less than the distribution mean p during the day. Since the distribution mean p decreases as the brightness (i.e., the illuminance) of a light source decreases, the distribution mean p on a cloudy day is less than the distribution mean p on a clear day.

If the image processing apparatus 12 determines that the distribution mean p of the acquired image is equal to or greater than the boundary mean threshold Ps, that is, if the distribution mean p of the acquired image is equal to or greater than a distribution mean Ps of an image captured in a very dark imaging scene during the night with no lighting, the process flow proceeds to step S125. That is, in imaging scenes other than very dark imaging scenes, the image processing apparatus 12 increases the combination ratio of the logarithmic tone-curve (i.e., the B-value) as the distribution mean p decreases, and decreases the combination ratio of the linear tone-curve (i.e., the A-value) and the combination ratio of the flattening tone-curve (i.e., the C-value) as the distribution mean p decreases.

With this configuration, use of the corrective tone-curve makes the characteristic of the logarithmic tone-curve based correction such that a dynamic range is expanded in low and high luminance areas, more effective in a darker imaging scene. This leads to corrected images which appropriately reflect a luminance ratio with a wide dynamic range during the night.

In addition, use of the corrective tone-curve can provide corrected images with the characteristic of the linear tone-curve based correction that clipped whites and crushed shadows are likely to occur in bright areas and dark areas of the acquired image, respectively, more suppressed in a darker imaging scene. Use of the corrective tone-curve can also provide corrected images with the characteristic of the flattening tone-curve based correction that contrast is too enhanced, more suppressed in a darker imaging scene.

Therefore, use of the corrective tone-curve can provide appropriate corrected images depending on the brightness of the imaging scene, more specifically, depending on day parts, the the presence of a light source, the weather or the like. The appropriate corrected image may include an image that appropriately represents contrast between a road surface and white lines or an image having smaller color changes.

The image recorder 13 records or displays corrected images that cause an occupant of the vehicle to feel less discomfort. The vehicle controller 14 performs white-line recognition based on the corrected images.

In addition, if the image processing apparatus 12 determines that the distribution mean p is less than the boundary mean threshold Ps, the process flow proceeds to step S120. That is, the image processing apparatus 12 is configured to set the combination ratio of the logarithmic tone-curve to 1, and the combination ratios of the linear tone-curve and the flattening tone-curve to 0. This leads to corrected images with the characteristic of the logarithmic tone-curve based correction that a dynamic range is expanded in low and high luminance areas, exploited in a very dark imaging scene, for example, during the night with no lighting.

3-3. Effects of Image Processing Based on Distribution Width q

The distribution width q of a captured image in an imaging scene that is evenly bright therethroughout is less than the distribution width q of a captured image in an imaging scene during the day with even distribution from bright to dark.

For example, as illustrated in FIG. 15, the imaging scene that is evenly bright therethroughout includes a scene that is evenly bright during the day (a third scene). In the third scene, the histogram of the captured image distributes with a small distribution width q (denoted by q_1) in a relatively high luminance interval. The imaging scene that is evenly bright therethroughout includes another scene in a tunnel during the day and night. In such an imaging scene, although not illustrated, the histogram of the captured image distributes with a small distribution width q in a relatively low luminance interval.

The imaging scene during the day with even distribution from bright to dark includes a scene through a tunnel exit (a fourth scene). In the fourth scene, the histogram of the captured image distributes with a very large distribution width q (denoted by q_2) and nearly even distribution of frequencies (where there are smaller changes in the frequency). As above, the dynamic range of the captured image expands as the distribution width q increases.

If the image processing apparatus 12 determines that the distribution width q is equal to or greater than the second threshold Qs2, then the process flow proceeds to step S155. That is, as the distribution width q increases, the image processing apparatus 12 decreases the combination ratio of the linear tone-curve and increases the combination ratios of the logarithmic tone-curve and the flattening tone-curve.

With this configuration, use of the corrective tone-curve makes the characteristic of the logarithmic tone-curve based correction more effective in a scene with more even distribution from bright to dark, that is, in a scene with a wider dynamic range. This leads to corrected images which appropriately reflect a luminance ratio.

In addition, use of the corrective tone-curve can provide corrected images with the characteristic of the linear tone-curve based correction that clipped whites and crushed shadows are likely to occur in bright areas and dark areas of the acquired image, respectively, suppressed. Use of the corrective tone-curve can also provide corrected images with enhanced contrast as the characteristic of the flattening tone-curve based correction.

Therefore, use of the corrective tone-curve can provide appropriate corrected images depending on the situation of distribution from bright to dark in the imaging scene, more specifically, depending on various scenes, such as a scene in a tunnel during the day and night, a scene through a tunnel exit during the day, and the like.

In addition, if the image processing apparatus 12 determines that the distribution width q is less than the second threshold Qs2 (that is, the distribution width q is very small), the process flow proceeds to step S150. That is, the image processing apparatus 12 sets the combination ratio of the linear tone-curve to 1, and the combination ratios of the logarithmic tone-curve and the flattening tone-curve to 0. With this setting, for acquired images with a small distribution width q (i.e., with poor contrast), corrected images can be acquired with the characteristic of the linear tone-curve based correction that contrast is appropriately represented, most exploited. For example, corrected images can be acquired with appropriate contrast between a road surface and white lines.

Figure 16:
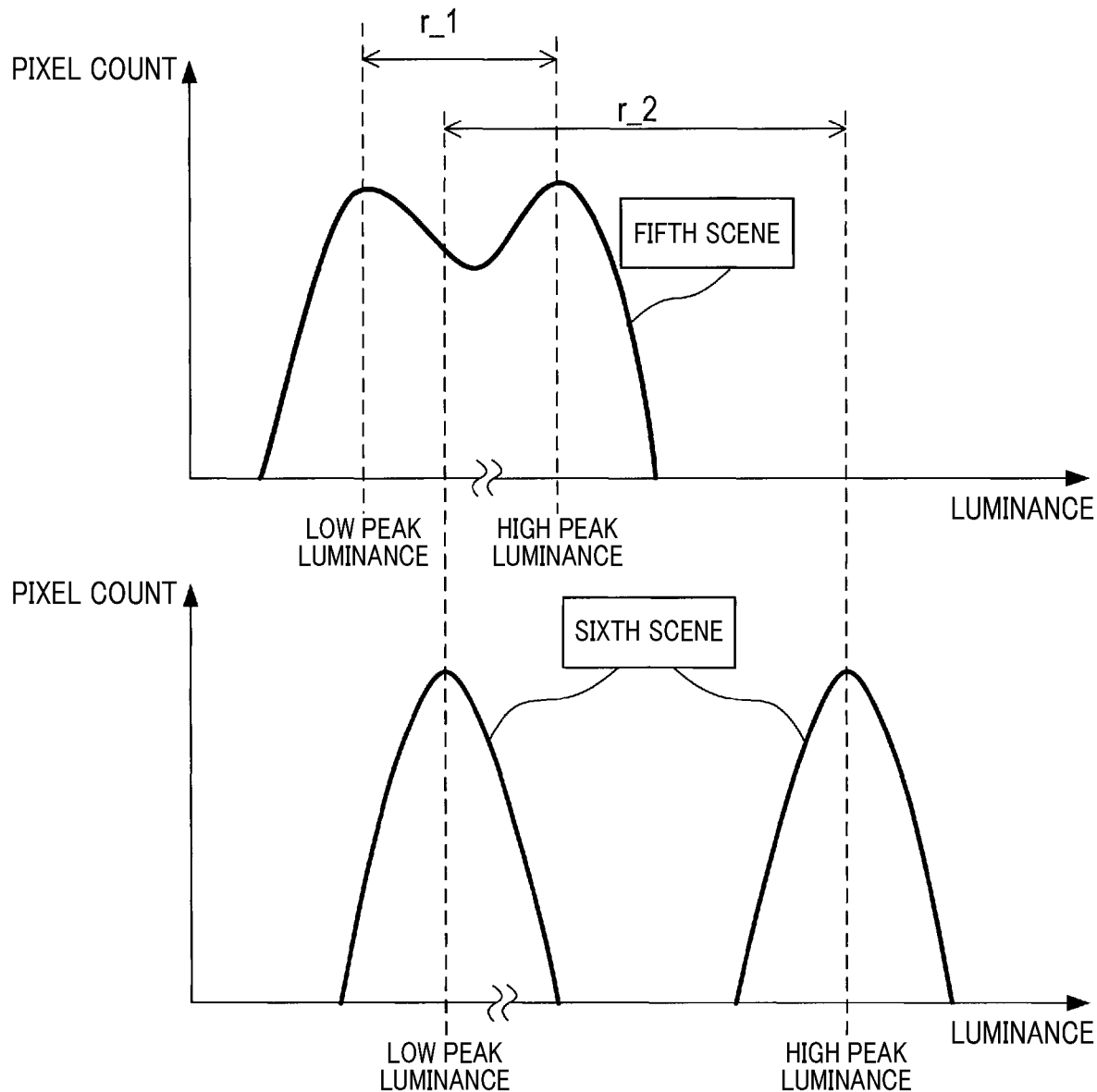
FIG. 16 is an example of peak luminance differences of histograms in fifth and sixth scenes.

3-4. Effects of Image Processing Based on Presence of Plural Separate Peak Luminances In the histogram of a captured image in an imaging scene with a skewed distribution between bright and dark during the day, a plurality of separate peak luminances appear. For example, as illustrated in FIG. 16, the scene with a skewed distribution between bright and dark during the day includes an imaging scene having both a white line in the sun and a white line in the shade during the sunny day (a fifth scene), where a plurality of separate peak luminances appear in the histogram of the captured image. In the fifth scene, the peak luminance difference r is equal to or greater than the first luminance difference threshold Rs1 (i.e., the peak luminance difference r_1≥Rs1).

If the image processing apparatus 12 determines that the peak luminance difference r is equal to or greater than the first threshold Rs1 and less than the second threshold Rs2, the process flow proceeds to step S190. As the peak luminance difference r increases, the image processing apparatus 12 increases the combination ratio of the flattening tone-curve and decreases the combination ratios of the linear tone-curve and the logarithmic tone-curve. With this configuration, use of the corrective tone-curve makes the characteristic of the flattening tone-curve based correction that contrast is enhanced, more effective for the acquired image with a larger peak luminance difference r. The image having a larger peak luminance difference r is an image with a more skewed distribution of luminance.

In addition, use of the corrective tone-curve can provide corrected images with the characteristic of the linear tone-curve based correction that clipped whites and crushed shadows are likely to occur in bright areas and dark areas of the acquired image, respectively, more suppressed as the distribution of luminance is more skewed. Use of the corrective tone-curve can also provide corrected images with the characteristic of the logarithmic tone-curve based correction that contrast is suppressed, more suppressed as the distribution of luminance is more skewed.

Therefore, use of the corrective tone-curve can provide appropriate corrected images depending on the situation of skewed distribution between bright and dark, more specifically, depending on various imaging scenes, such as an imaging scene having both a white line in the sun and a white line in the shade during the sunny day.

In addition, if, as illustrated in FIG. 16 (as a sixth scene), the peak luminance difference r is equal to or greater than the second threshold Rs2 (i.e., r_2≥Rs2), the image processing apparatus 12 sets the combination ratio of the flattening tone-curve to 1, and the combination ratios of the linear tone-curve and the logarithmic tone-curve to 0. The sixth scene is an example scene with a very large degree of skew in the distribution between bright and dark. With this setting, for an acquired image with a large peak luminance difference r (i.e., with a significantly skewed distribution between bright and dark), use of the corrective tone-curve provides corrected images with the characteristic of the flattening tone-curve based correction that contrast is moderately enhanced, more exploited.

4. Advantages

The embodiment described above provides the following advantages.

(1a) The image processing apparatus 12 generates a corrective tone-curve based on the histogram of the captured image, and using the corrective tone-curve, corrects a relationship between the luminance and the pixel count in the captured image, thereby generating an output image.

The histogram of the captured image acquired from the on-board camera 11 has a different distribution depending on the imaging scene. The imaging scene is a situation when the acquired image was captured by the on-board camera 11, including, for example, day parts, weather (e.g., cloudy, sunny, and the like), and places (e.g., in front of a tunnel entrance, in a tunnel, and the like). In recent years, the dynamic range of the on-board camera 11 tends to expand.

Therefore, the histogram distributes over a wide range of luminance. For example, in some situations of distribution of the histogram, applying luminance correction using the same tone-curve to all the captured images may not lead to appropriate corrected images depending on imaging scenes.

The image processing apparatus 12 generates a corrective tone-curve based on the histogram of the captured image, and using the corrective tone-curve, performs luminance correction of the captured image. This allows for luminance correction using corrective tone-curve depending on the imaging scene. That is, appropriate corrected images can be acquired depending on the imaging scenes.

(1b) The image processing apparatus 12 combines a plurality of basic tone-curves at step S20, and based on the histogram of the captured image, determines combination ratios of the respective basic tone-curves for generating a corrective tone-curve. At step S30, the image processing apparatus 12 combines the plurality of basic tone-curves in the determined combination ratios, thereby generating a corrective tone-curve.

As described above, the histogram of the captured image distributes over a wide luminance range. For example, performing luminance correction of such a captured image using a single tone-curve, such as a linear tone-curve, may cause crushed shadows and clipped whites in high and low luminance areas of the captured image, respectively. Thus, an inappropriate corrected image may be generated.

The image processing apparatus 12 combines the plurality of basic tone-curves in the combination ratios based on the histogram of the captured image. This can provide an appropriate corrected image even for the captured image with a wide dynamic range. That is, an appropriate corrected image can be acquired depending on the imaging scene.

(1c) The image processing apparatus 12 may be configured to generate at least one of the plurality of basic tone-curves based on the histogram of the captured image. In the present embodiment, the image processing apparatus 12 is configured to generate all of the plurality of basic tone-curves at steps S4-S6 based on the histogram of the captured image. At step S10, the image processing apparatus 12 acquires the basic tone-curves generated at steps S4-S6.

The image processing apparatus 12 performs luminance correction using the corrective tone-curve acquired from the basic tone-curves generated based on the histogram of the captured image, which enables acquisition of an appropriate corrected image depending on the imaging scene.

(1d) The image processing apparatus 12 detects, in the histogram of the captured image, at least one of a distribution mean p, a distribution width q, and the presence of a plurality of peaks, and based on a result of detection, determines combination ratios of respective ones of the plurality of basic tone-curves. Depending on the imaging scene, the histogram of the captured image is characterized in the distribution mean, the distribution width, and the number of peaks. The image processing apparatus 12 determines the combination ratios depending on the imaging scene, which enables luminance correction depending on the imaging scene. That is, an appropriate corrected image can be acquired depending on the imaging scene.

(1e) The image processing apparatus 12 acquires the linear tone-curve, the logarithmic tone-curve, and the flattening tone-curve as the plurality of basic tone-curves at step S10. A corrective tone-curve can be generated by combining the plurality of basic tone-curves different in characteristics. That is, the corrective tone-curve having a complex characteristic can be generated, leading to an appropriate corrected image depending on the imaging scene.

(1f) The image processing apparatus 12 determines the combination ratios of the basic tone-curves at steps S115-S130, S200-S205 such that, as the distribution mean p decreases, the combination ratio of the logarithmic tone-curve is increased and the combination ratios of the linear tone-curve and the flattening tone-curve are decreased. Use of the resultant corrective tone-curve can lead to appropriate corrected images depending on the brightness of the imaging scene, more specifically, day parts, the presence of illumination, the weather or the like.

The image processing apparatus 12 acquires the distribution mean information. If the distribution mean p is equal to or greater than the boundary mean threshold Ps, then the image processing apparatus 12 may determine the respective combination ratios based on the distribution mean information. If the distribution mean p is less than the boundary mean threshold Ps, then the image processing apparatus 12 may set the combination ratio of the logarithmic tone-curve to 1.

(1g) The image processing apparatus 12 determines the combination ratios of the basic tone-curves at steps S135-S160, S200-S205 such that, as the distribution width q increases, the combination ratio of the linear tone-curve is decreased and the combination ratios of the logarithmic tone-curve and the flattening tone-curve are increased. Use of the resultant corrective tone-curve can lead to appropriate corrected images depending on the situation of distribution from bright to dark of the imaging scene, more specifically, various scenes, such as a scene in a tunnel during the day and night, a scene through a tunnel exit during the day, and the like.

The image processing apparatus 12 acquires the distribution width information. If the distribution width q is equal to or greater than the second distribution width threshold Qs2, then the image processing apparatus 12 may determine the respective combination ratios based on the distribution width information. If the distribution width q is less than the second distribution width threshold Qs2, then the image processing apparatus 12 may set the combination ratio of the linear tone-curve to 1.

(1h) The image processing apparatus 12 detects the peak luminance difference r and determines the presence or absence of a plurality of separate peak luminances at steps S165-S205. If the image processing apparatus 12 determines the presence of a plurality of separate peak luminances, the image processing apparatus 12 determines the combination ratios of the basic tone-curves such that, as the peak luminance difference r increases, the combination ratio of the flattening tone-curve is increased and the combination ratios of the linear tone-curve and the logarithmic tone-curve are decreased.

Use of the resultant corrective tone-curve can lead to appropriate corrected images depending on the situation of the skewed distribution between bright and dark in the imaging scene, more specifically, depending on various imaging scenes, such as an imaging scene having both a white line in the sun and a white line in the shade during the sunny day.

The image processing apparatus 12 acquires the luminance difference information. If the peak luminance difference r is equal to or greater than the first luminance difference threshold Rs1 and less than second luminance difference threshold Rs2, then the image processing apparatus 12 may determine the respective combination ratios based on the luminance difference information. If the peak luminance difference r is equal to or greater than the second luminance difference threshold Rs2, then the image processing apparatus 12 may set the combination ratio of the flattening tone-curve to 1 at step S185.

5. Other Embodiments

While the embodiments of the present disclosure have been described above, the present disclosure is not limited to the above-described embodiments, and can be implemented with various modifications.

(5a) In the above described embodiment, the image processing apparatus 12 is configured to generate all of the plurality of basic tone-curves depending on the histogram of the acquired image. In an alternative embodiment, the image processing apparatus 12 may be configured to generate at least one of the plurality of basic tone-curves depending on the histogram of the acquired image.

(5b) In an alternative embodiment, the image processing apparatus 12 may be configured to, regardless of the magnitude of the distribution mean p, set pa, pb, and pc depending on the distribution mean p. In such an embodiment, steps S115-S120 may be deleted. In an alternative embodiment, the image processing apparatus 12 may be configured to, depending on the distribution width q regardless of the magnitude of the distribution width q, set qa, qb, and qc based on the distribution width information. In such an embodiment, steps S145-S150 may be deleted.

In an alternative embodiment, the image processing apparatus 12 may be configured to, depending on the peak luminance difference r regardless of the magnitude of the peak luminance difference r, set ra, rb, and rc based on the luminance difference information. In such an embodiment, steps S175-S185 may be deleted.

(5c) The image processing apparatus 12 and method described in the present disclosure may be implemented by a special purpose computer including a memory and a processor programmed to perform one or more specific functions embodied by the computer program. Alternatively, the image processing apparatus 12 and method described in the present disclosure may be implemented by a special purpose computer including a processor provided by one or more special purpose hardware logic circuits.

Alternatively, the image processing apparatus 12 and method described in the present disclosure may be implemented by a special purpose computer including a combination of a memory and a processor programmed to perform one or more specific functions and a processor provided by one or more hardware logic circuits. The computer program may also be stored, as instructions executable by a computer, in a computer readable non-transitory tangible storage medium.

The functions of the the image processing apparatus 12 may not be necessarily implemented by software, but some or all of the functions may be implemented using one or more hardware units.

(5d) A plurality of functions of one component in the above-described embodiments may be realized by a plurality of components, or one function of one component may be realized by a plurality of components. Further, a plurality of functions of a plurality of components may be realized by one component, or one function to be realized by a plurality of components may be realized by one component. Still further, part of the components of the above-described embodiments may be omitted. In addition, at least part of the components of the above-described embodiments may be added to or replaced with the components in another embodiment.

(5e) This disclosure may be implemented in various modes including not only the image processing apparatus 12, the CPU 21, the image processing system 100, but also programs to cause the image processing apparatus 12 to function, a non-transitory tangible storage medium, such as a semiconductor memory, storing the programs, and an image processing method.

Figure 2B:
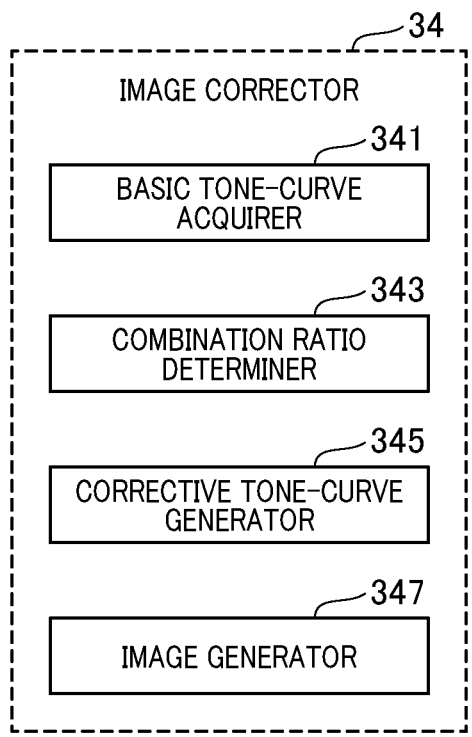
FIG. 2B is a functional block diagram of an image corrector.

In the above described embodiment, as illustrated in FIG. 2B, the image corrector 34 of the image processing apparatus 12 includes, as functional blocks, a basic tone-curve acquirer 341, a combination ratio determiner 343, a corrective tone-curve generator 345, and an image generator 347. The basic tone-curve acquirer 341 is responsible for execution of step S10. The combination ratio determiner 343 is responsible for execution of step S20. The corrective tone-curve generator 345 is responsible for execution of step S30. The image generator 347 is responsible for execution of step S40.

What is claimed is:

1. An image processing apparatus comprising:
    an image acquirer configured to acquire a captured image from a camera mounted to a vehicle;
    a histogram generator configured to generate a histogram representing a relationship between a luminance and a pixel count of the captured image, the pixel count being a number of pixels in the captured image; and
    an image corrector configured to, based on the histogram of the captured image, generate a corrective tone-curve for correcting the relationship between the luminance and the pixel count of the captured image, the corrective tone-curve being a tone-curve representing a relationship between input and output values of luminance, and correct the captured image using the corrective tone-curve to generate a corrected image,
    wherein the image corrector comprises:
    a basic tone-curve acquirer configured to acquire a plurality of basic tone-curves of different types;
    a combination ratio determiner configured to determine combination ratios of the respective basic tone-curves based on the histogram of the captured image, the combination ratios being used to combine the plurality of basic tone-curves to generate the corrective tone-curve;
    a corrective tone-curve generator configured to combine the plurality of basic tone-curves in the combination ratios to generate the corrective tone-curve; and
    an image generator configured to correct the captured image using the corrective tone-curve to generate the corrected image.

2. The image processing apparatus according to claim 1, wherein
    the combination ratio determiner is configured to detect at least one of a distribution mean of the histogram that is a sum of a product of the luminance and the pixel count of each luminance in the histogram, divided by the total pixel count, a distribution width that is a luminance width in the histogram of the captured image, and the presence of a plurality of separate peak luminances in the histogram, and determine the combination ratios of respective ones of the plurality of basic tone-curves based on the detected at least one of the distribution mean, the distribution width, and the presence of a plurality of separate peak luminances.

3. The image processing apparatus according to claim 2, wherein
    the plurality of basic tone-curves include a linear tone-curve defining the relationship between input and output values of luminance that is linear, a logarithmic tone-curve defining the relationship between input and output values of luminance that is logarithmic, and a flattening tone-curve defining the relationship between input and output values of luminance that flattens the pixel counts, and the basic tone-curve acquirer is configured to acquire the linear tone-curve, the logarithmic tone-curve, and the flattening tone-curve as the plurality of basic tone-curves.

4. The image processing apparatus according to claim 3, wherein the combination ratio determiner is configured to detect the distribution mean in the histogram of the captured image, and as the distribution mean decreases, increase the combination ratio of the logarithmic tone-curve and decrease the combination ratios of the linear tone-curve and the flattening tone-curve.

5. The image processing apparatus according to claim 3, wherein the combination ratio determiner is configured to detect the distribution width in the histogram of the captured image, and as the distribution width increases, decrease the combination ratio of the linear tone-curve and increase the combination ratios of the logarithmic tone-curve and the flattening tone-curve.

6. The image processing apparatus according to claim 3, wherein the combination ratio determiner is configured to detect a peak luminance difference in the histogram of the captured image, determine presence or absence of a plurality of separate peak luminances in the histogram of the captured image based on the peak luminance difference, and in response to determining the presence of a plurality of separate peak luminances, increase the combination ratio of the flattening tone-curve and decrease the combination ratios of the linear tone-curve and the logarithmic tone-curve, as the peak luminance difference increases.

7. An image processing apparatus comprising:

a non-transitory memory storing one or more computer programs;

a processor executing the one or more computer programs to:

acquire a captured image from a camera mounted to a vehicle;

generate a histogram representing a relationship between a luminance and a pixel count of the captured image, the pixel count being a number of pixels in the captured image; and generate, based on the histogram of the captured image, a corrective tone-curve for correcting the relationship between the luminance and the pixel count of the captured image, the corrective tone-curve being a tone-curve representing a relationship between input and output values of luminance, and correct the captured image using the corrective tone-curve to generate a corrected image, wherein the processor further executes the one or more computer programs to:

acquire a plurality of basic tone-curves of different types;

determine combination ratios of the respective basic tone-curves based on the histogram of the captured image, the combination ratios being used to combine the plurality of basic tone-curves to generate the corrective tone-curve;

combine the plurality of basic tone-curves in the combination ratios to generate the corrective tone-curve; and correct the captured image using the corrective tone-curve to generate the corrected image.

8. An image processing method comprising:

acquiring a captured image from a camera mounted to a vehicle;

generating a histogram representing a relationship between a luminance and a pixel count of the captured image, the pixel count being a number of pixels in the captured image; and generating, based on the histogram of the captured image, a corrective tone-curve for correcting the relationship between the luminance and the pixel count of the captured image, the corrective tone-curve being a tone-curve representing a relationship between input and output values of luminance, and correct the captured image using the corrective tone-curve to generate a corrected image, wherein the method further comprises:

acquiring a plurality of basic tone-curves of different types;

determining combination ratios of the respective basic tone-curves based on the histogram of the captured image, the combination ratios being used to combine the plurality of basic tone-curves to generate the corrective tone-curve;

combining the plurality of basic tone-curves in the combination ratios to generate the corrective tone-curve; and correcting the captured image using the corrective tone-curve to generate the corrected image.

* * * * *